Sept. 3, 1935. H. M. OLMSTEAD 2,013,217
METHOD AND MEANS FOR COUPLING ELECTRIC CONDUITS
Filed June 21, 1934
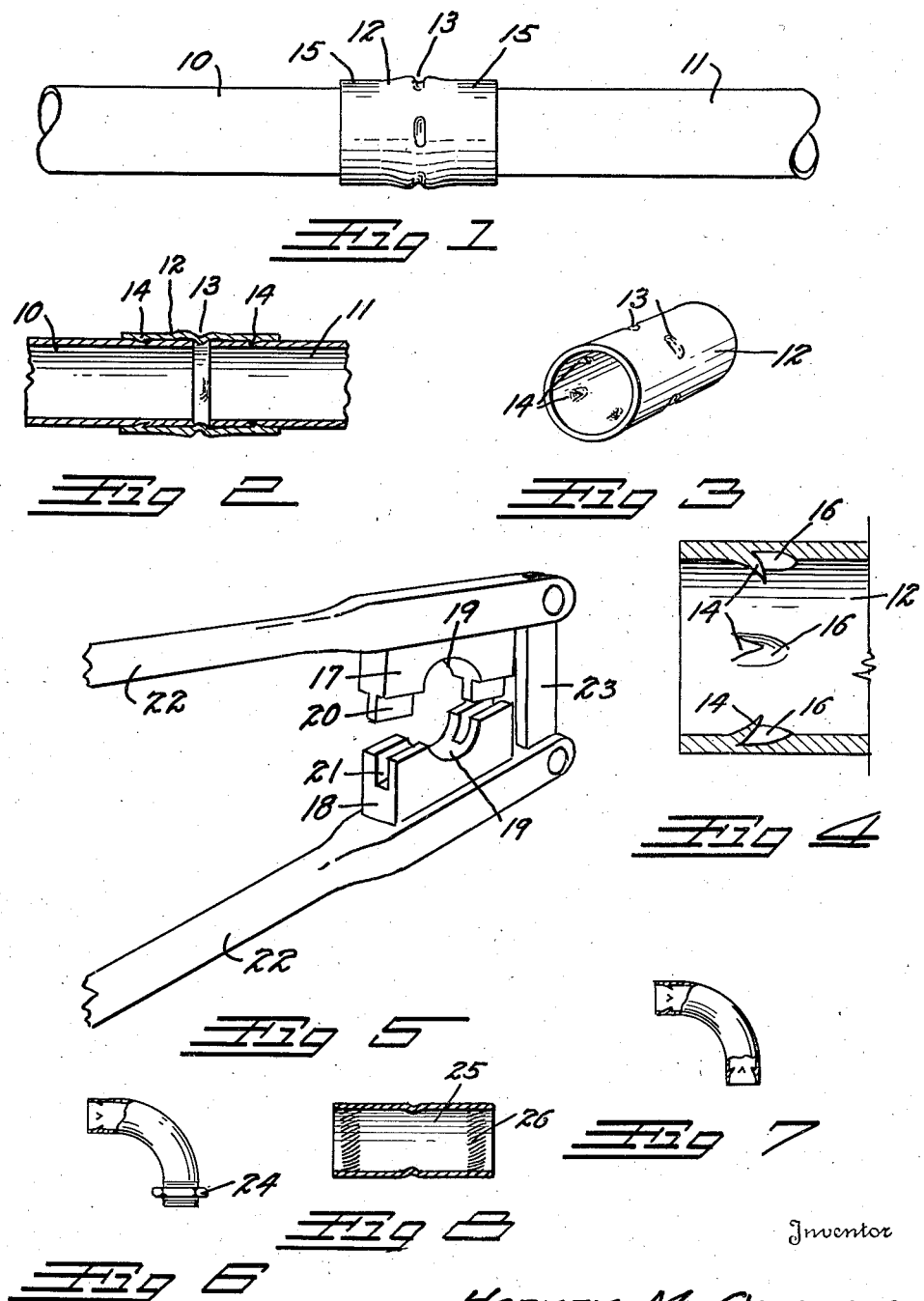
Inventor
HARVEY M. OLMSTEAD
By
Attorney Patented Sept. 3, 1935

2,013,217

UNITED STATES PATENT OFFICE 2,013,217

METHOD AND MEANS FOR COUPLING ELECTRIC CONDUITS

Harvey M. Olmstead, Denver, Colo.

Application June 21, 1934, Serial No. 731,589

3 Claims. (Cl. 285—193)

It is the present custom to place the electrical wiring in buildings in a comparatively thin walled tube in place of the heavy walled conduit originally employed. It is impractical to thread this thin tubing for connection with the usual couplings and fittings.

The principal object of this invention is to provide means for connecting lengths of this tubing which will eliminate the need of threading; which will rigidly and securely connect the lengths; which will be inexpensive to manufacture; and which can be easily and quickly applied.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:—

Fig. 1 illustrates two lengths of tubing connected by a coupling in which the invention is embodied.

Fig. 2 is a longitudinal section through the coupling of Fig. 1.

Fig. 3 is a perspective view of the improved coupling.

Fig. 4 is a magnified view illustrating the attachment fangs.

Fig. 5 illustrates a tool employed for placing the coupling in place.

Figs. 6 and 7 illustrate the invention applied to typical fittings.

Fig. 8 is a detail view of alternate form of coupling.

In the drawing, typical lengths of electrical conduit tubing are indicated at 10 and 11. The invention is adaptable to any type of fitting which it may be desired to secure to the extremities of the tubing.

In Fig. 1, the invention is illustrated as applied to a coupling 12. This coupling is formed as shown in Fig. 3. It comprises a relatively short cylinder of comparatively harder metal than the metal from which the tubings 10 and 11 are formed. Circumferentially about the mid-portion of the coupling, a series of indentations 13 are formed which project slightly into the interior of the coupling. Adjacent each extremity of the coupling and on the interior thereof, a series of relatively sharp pointed fangs 14 are formed.

These fangs 14 may be formed on any suitable die or cutting tool of a type which will cut into the interior surface to form a depression 16 and turn the metal therefrom inwardly to form the fangs 14.

In joining the coupling to the tubings, each tube is forced into an extremity of the coupling until it contacts with the indentations formed by the depressions 13. This assures that the tubings will be forced into the coupling an equal distance. As the tubings pass into the couplings, they will tend to force the fangs 14 outwardly, causing the latter to scratch or bite into the softer metal of the tubing. The extremities of the coupling are then contracted, as indicated at 15, so as to force the fangs into the metal of the tubings, as shown in Fig. 2.

This procedure absolutely locks the tubing into the coupling. Any attempt to withdraw the tubing only serves to cause the fangs to bite more deeply and more firmly into the metal of the tubing.

The contracting of the extremities may be accomplished in any desired manner. A tool for this purpose is illustrated in Fig. 5 and comprises a male die 17 and a female die 18, both of which contain semi-circular throats 19 of a diameter equal to the finished diameter of the coupling. The male die carriage aligning tenons 20 which pass into receiving mortices 21 in the female die so as to prevent spreading of the coupling between the dies. The dies may be compressed in any desired manner such as by means of pressure levers 22 joined by a fulcrum link 23.

The invention has been described as applied to a simple coupling fitting. It is of course applicable to any type of fitting, such as the straight elbow of Fig. 7 or the terminal elbow of Fig. 6. The latter is threaded at one extremity and provided with a lock nut 24 for terminating a line of tubing at a junction or switch box.

In Fig. 8, an alternate form of coupling is shown at 25, containing two internal bands of knurling 26 which will bite into the metal of the conduits 10 and 11 similarly to the teeth or fangs 14.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. Means for connecting metallic electric conduit comprising: a cylindrical sleeve for receiving extremities of said conduit; indentions formed midway of said sleeve to limit the amount of insertion of said conduit; fangs formed from the metal of said sleeve on the inner surface thereof so as to bite into the metal of said conduit, said fangs consisting of relatively sharp, metallic points cut and turned from the metal of said sleeve and inclined inwardly from the extremities thereof.

2. Means for connecting metallic electric conduit comprising: a cylindrical sleeve for receiving extremities of said conduit; indentions formed midway of said sleeve to limit the amount of insertion of said conduit; fangs formed from the metal of said sleeve on the inner surface thereof so as to bite into the metal of said conduit, said sleeve being contracted at its extremities so as to force said fangs into said conduit.

3. In a sleeve for connecting the extremities of tubings comprising: a short tubular member of a diameter to snugly receive said tubings; relatively short pointed teeth formed on the inner surface of said tubings, said teeth being inclined inwardly so as to bite into said tubings when the latter are withdrawn, said teeth comprising: relatively narrow pointed metallic prongs cut and turned from the interior surface of said sleeve.

HARVEY M. OLMSTEAD.